Sept. 19, 1933.  E. R. EVANS  1,927,632
BRAKE LINKAGE
Filed Jan. 29, 1932  4 Sheets-Sheet 1
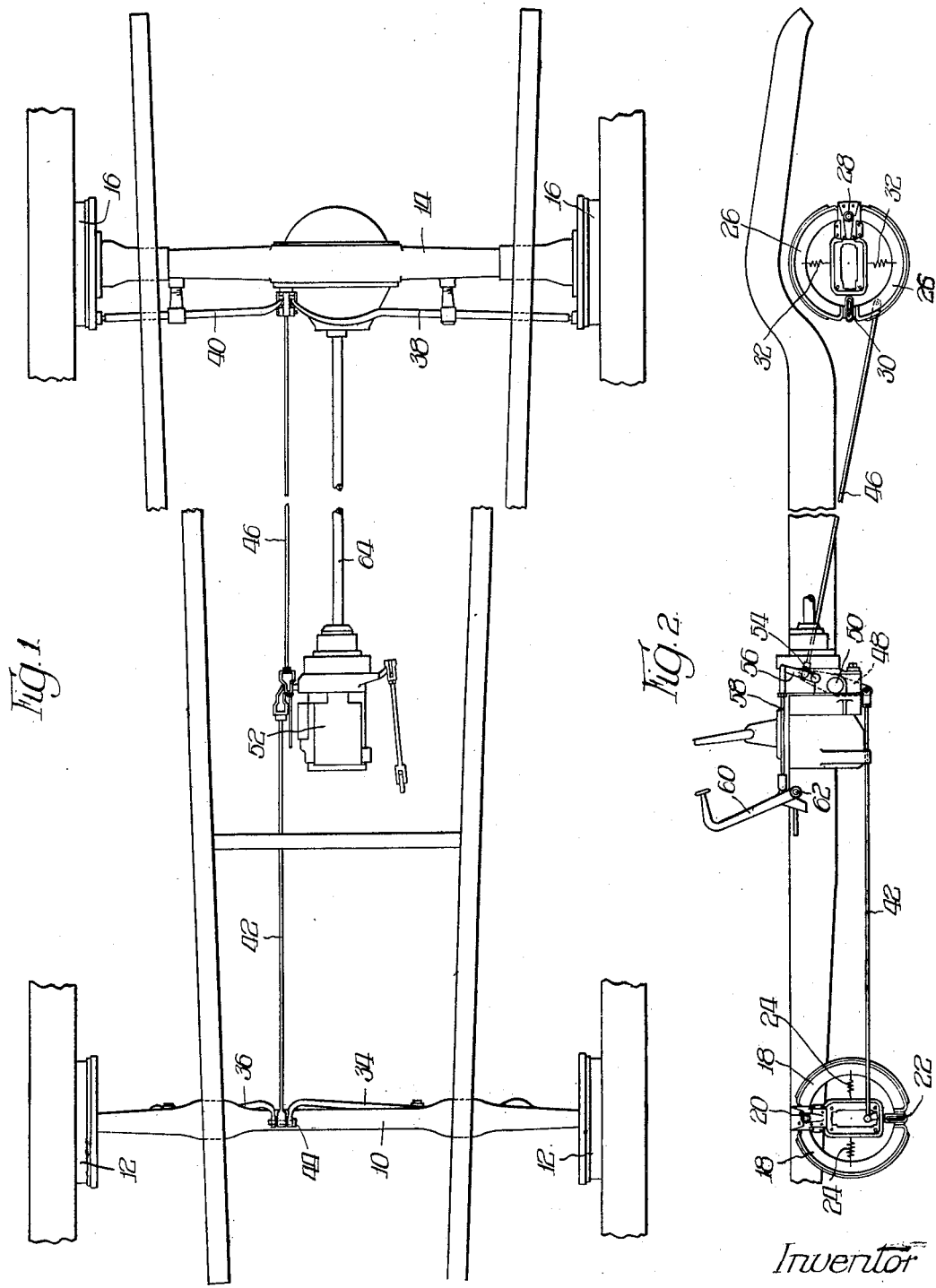
Inventor
Edwin R. Evans.
By Wilkinson Huxley Byron Knight
attys Sept. 19, 1933.  E. R. EVANS  1,927,632
BRAKE LINKAGE
Filed Jan. 29, 1932  4 Sheets-Sheet 2
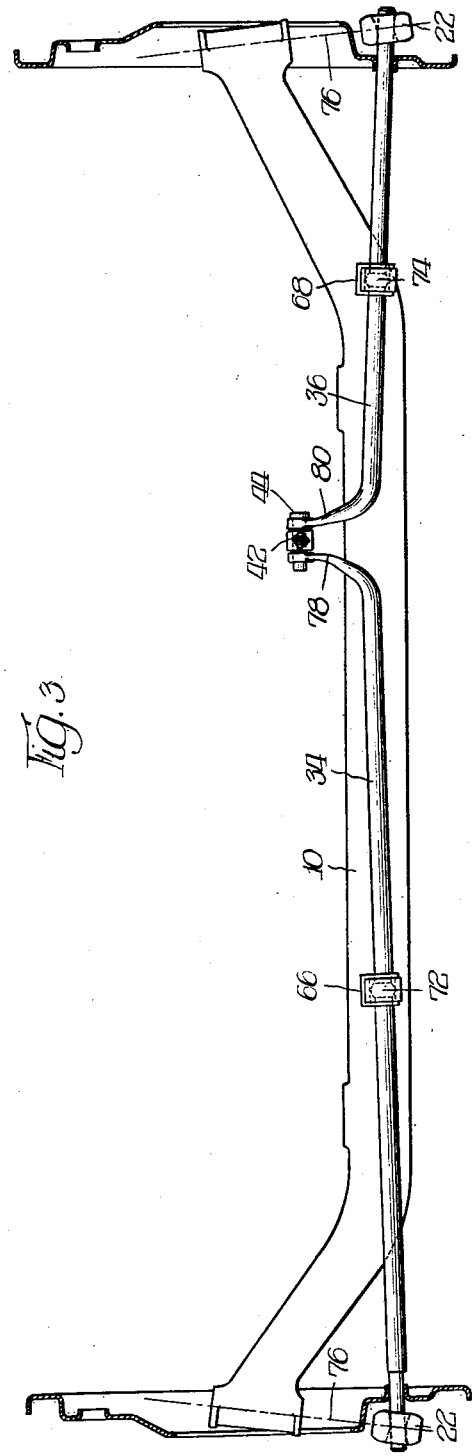
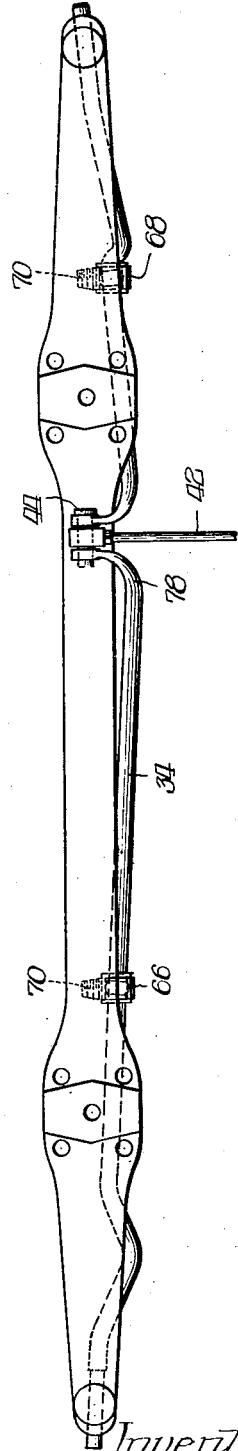
Inventor:
Edwin R. Evans

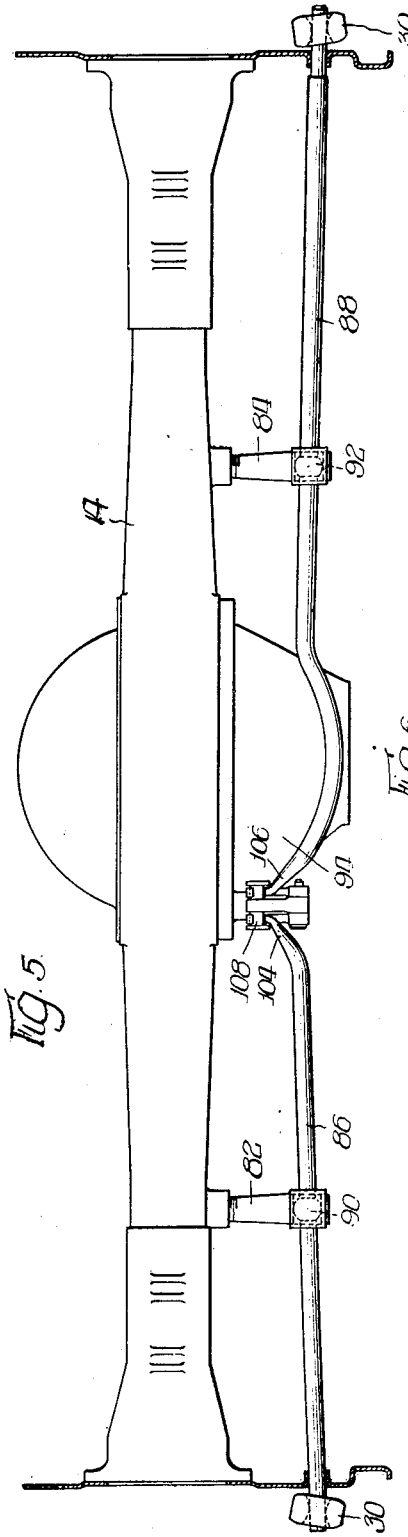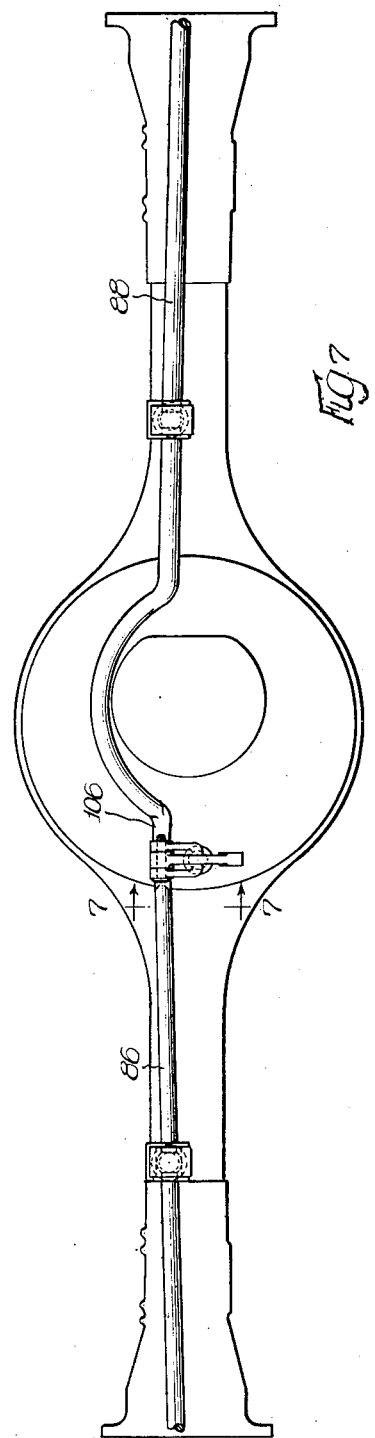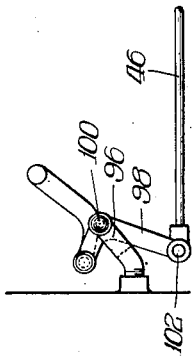

Sept. 19, 1933.  E. R. EVANS  1,927,632
BRAKE LINKAGE
Filed Jan. 29, 1932    4 Sheets-Sheet 4
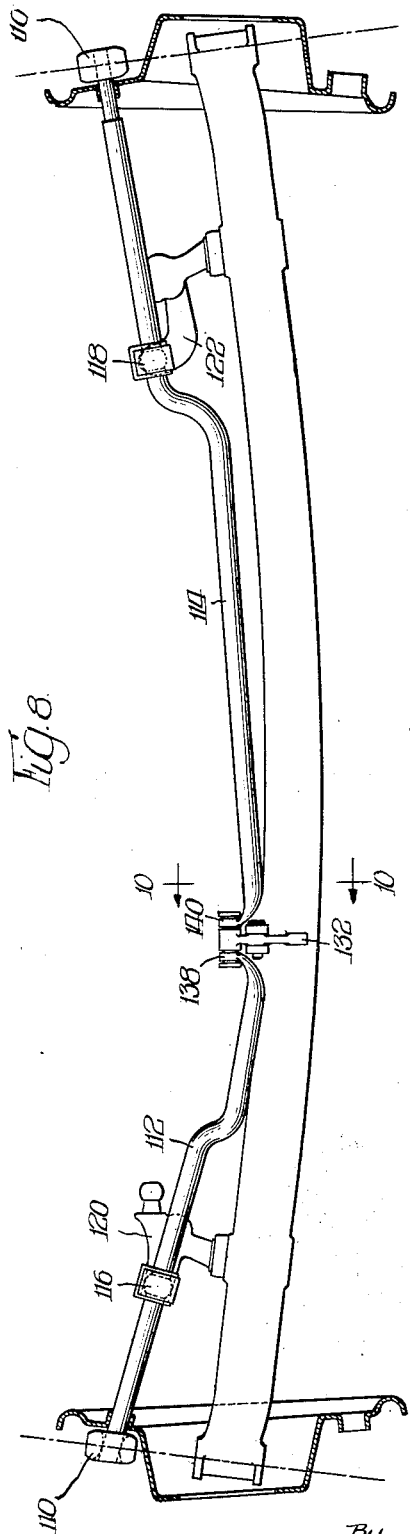
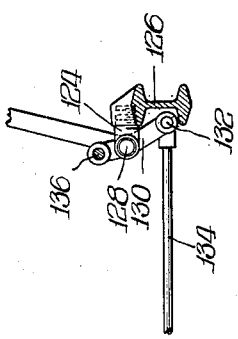
Inventor:
Edwin R. Evans,
By ~~~~ Attys Patented Sept. 19, 1933

1,927,632

UNITED STATES PATENT OFFICE 1,927,632

BRAKE LINKAGE

Edwin R. Evans, Chicago, Ill.

Application January 29, 1932. Serial No. 589,589

3 Claims. (Cl. 188—10)

The present invention relates to improvements in the brake linkage of motor vehicles particularly vehicles having four-wheel brakes.

It has previously been proposed to use wheel brakes for motor vehicles including a pair of brake shoes anchored at adjacent ends and having a rotatable actuating cam between the other pair of ends. The wheel brakes are actuated by rock shafts universally supported at their inner ends upon the axle and the breaking force has been applied to the rock shafts in such a manner as to produce rotation only of the rock shafts and therefore rotation only of the brake actuating cams. Since the shoes in the wheel brake anchor in opposite directions, one shoe of each brake will be a wrap shoe and the other an unwrap shoe, depending upon the direction in which the vehicle is traveling. The wrap shoes in such a system will develop a greater amount of breaking pressure than the unwrap shoes.

It is an object of the present invention to transmit a greater brake applying force to the unwrap shoes of the wheel brakes during forward travel of the vehicle than to the wrap shoes, whereby the effective braking of the shoes will be substantially equalized.

It is further an object of the present invention to transmit greater pressure to the unwrap brake shoes by transmitting a brake applying force to rock shafts which are universally supported on the axles of the vehicle in such manner as to produce not only rotation of the rock shafts but also a leverage which tends to rotate each of the rock shafts angularly about its support upon the axle in such a manner that the brake applying cams are moved towards the unwrap brake shoes.

Further objects and advantages of the present invention will be more readily apparent from the following description taken in connection with the attached drawings, in which Figure 1 is a plan view of the brake linkage;

Figure 2 is a side elevation of the brake linkage;

Figure 3 is an elevation of the rock shafts supported upon the front axle;

Figure 4 is a plan view of the rock shafts supported upon the front axle;

Figure 5 is a plan view of the rock shafts supported upon the rear axles;

Figure 6 is an elevation of the rock shafts supported upon the rear axles;

Figure 7 is a detail section taken on the plane indicated 7—7 in Figure 6;

Figure 8 is an elevation similar to Figure 3 showing a modified support for the rock shafts upon the front axle;

Figure 9 is a plan view of the rock shafts shown in Figure 8, and

Figure 10 is a detail transverse section illustrating the support for the rock shafts shown in Figures 8 and 9.

The chassis frame and general arrangement of the brake linkage is illustrated in Figures 1 and 2. There is shown a front axle 10, a pair of front wheel brakes 12—12, a rear axle 14, and a pair of rear wheel brakes 16—16. The front wheel brake construction is shown to comprise a pair of segmental brake shoes 18—18 which bear at their upper spaced ends against an adjustable anchor pin 20 and bear at their lower spaced ends against a rotatable brake actuating cam 22. The brake shoes are normally held in released position by the release springs 24. This type of wheel brake is called a normally energized brake since, upon actuation, one of the shoes will have a tendency to wrap towards the anchor pin due to the rotation of the brake drum and the other shoe will have a tendency to unwrap away from the anchor pin. Therefore, under normal condition of operation, one shoe would be an energized shoe and would develop greater braking pressure than the other shoe. Thus, during forward travel of the vehicle the rearward shoe of the pair of brake shoes 18—18 would be the shoe having a tendency to wrap towards the anchor pin and thereby developing greater braking pressure than the forward shoe.

It is a feature of the present invention that the brake linkage is so designed that the brake applying force not only tends to rotate the cam to expand the brake shoes but also tends to move the cam laterally in a direction to increase the braking pressure of the unwrapped shoe and thereby tend to equalize the braking pressures of the two shoes. The same action is brought about in the rear wheel brakes, one of which is shown in detail in Figure 2 and comprises a pair of segmental brake shoes 26—26 bearing at their rearward spaced ends against an adjustable anchor pin 28 and bearing at their forward spaced ends against an expanding cam 30. The shoes 26 are held in released position by the springs 32.

In the rear wheel brakes the rotatable cams 30 are shown to be in a horizontal plane passing through the axis of rotation of the wheels whereas the front wheel brake cams 22 are arranged in a vertical plane passing through the axis of rotation of the wheels. In the rear wheel brakes during forward travel of the vehicle the upper shoes will have a tendency to unwrap away from the anchor pin and the lower shoes will have a tendency to wrap toward the anchor pin. Therefore to develop greater pressure upon the unwrap shoes of the rear wheel brakes, it is necessary to develop a force upon the cam to produce not only rotation but also upward movement of the cam.

Figures 1 and 2 illustrate the brake linkage comprising a front cam actuating shaft 34 carried by the front axle 10 and connected to the cam 22 of the left-hand front wheel brake while a second cam actuating shaft 36 is carried by the axle 10 and connected to the cam 22 of the right-hand wheel brake. The rear axle 14 similarly supports a left-hand cam shaft 38 and a right-hand cam shaft 40. The details relating to the formation of the cam shafts and their supports upon the axles will be later more fully described, but it will be understood from Figures 1 and 2 that a pull rod 42 is connected by pin 44 to transmit actuating movement to the front cam shafts 34 and 36, while a pull rod 46 transmits actuating movement to the rear cam shafts 38 and 40. The pull rods 42 and 46 are pivotally connected to the lower and upper arms respectively of a double arm brake lever 48 which is carried by a rock shaft 50.

In the present disclosure I have shown the rock shaft 50 to be part of a power brake 52 having an input rock shaft 54 adapted to be controlled by input lever 56, pull rod 58 and pedal 60, which is carried by pivot 62. The power brake 52 is associated with the propeller shaft 64 and operates in a well-known manner to amplify the input force produced by the actuation of the pedal and to transmit the amplified braking force through a rotation of the output rock shaft 50 for actuation of the front and rear brakes.

The detail construction for the support of the front cam shafts is shown in elevation in Figure 3 and in plan in Figure 4. The front axle 10 has secured thereto a pair of bearing supports 66 and 68 each of which is threaded into the axle, as shown at 70. Each of the cam shafts 34 and 36 has a spherical shaped bearing portion 72 and 74 fitting within the bearing supports 66 and 68, whereby the cam shafts are confined against endwise movement but are free to have universal movement about the centers of the bearing supports.

As shown in Figure 3 the centers of the cams 22 which are carried on the outer end of the cam shafts 34 and 36 are in alignment with the swiveling axes 76 of the front wheels and therefore turning of the front wheels does not interfere with the actuation of the brakes. The adjacent ends of the cam shafts 34 and 36 are turned upwardly, as indicated at 78 and 80, so that the axis of the pin 44, which is connected between the upturned ends 78 and 80 of the cam shaft to the end of the pull rod 42, is offset with respect to the normal axis of rotation of the cam shafts. The amount of offset determines the input leverage tending to produce rotation of the brake cams while the contour of the cams will determine the output leverage for producing expansion of the shoes upon rotation of the cams. In addition, however, the pull of the rod 42 tends to rotate each of the cam shafts about the vertical axes passing through the centers of the bearing supports 66 and 68. Therefore in Figure 4, the end 78 of the cam shaft 34 will be moved rearwardly and the cam 22 on the outer end of the cam shaft will be moved forwardly tending to subject a greater pressure upon the unwrap brake shoe. The same action will occur upon the other cam shaft 36. It will be noted that the pull rods 42 and 46 cannot, in practice, be placed at the center of the vehicle and therefore the cam shafts 34 and 36 cannot be of equal length, but it is only necessary to so position the supporting bearings 66 and 68 such that they divide the shafts 34 and 36 proportionately to obtain equalized braking pressures.

Figures 5 and 6 illustrate in detail the rear wheel brake arrangement. The rear axle 14 carries supporting members 82 and 84. A pair of rear brake actuating cross shafts 86 and 88, having spherical bearing members 90 and 92 are carried, with freedom for universal movement, by the supports 82 and 84 in the same manner as the front brake actuating cross shafts 34 and 36. Adjacent one side of the differential housing 94 is a yoke-shaped supporting member 96 carried by the axle 14. The support 96 carries a bell crank lever 98 on pivot pin 100. The pull rod 46 is pivotally connected at 102 to the depending arm of the bell crank lever 98 while the adjacent ends 104 and 106 of the shafts are pivotally supported by the upper arm of the bell crank lever 98 through means of a pivot pin 108.

Referring to Figure 7 it will be apparent that actuation of the pull rod 46 will rotate the bell crank lever 98 in a direction to rotate the shafts 86 and 88 and also tend to move the ends 104 and 106 of the shafts downwardly while the cams 30 at the outer ends of the shafts will be moved upwardly thereby throwing greater pressure upon the unwrap brake shoes.

Figures 8, 9 and 10 illustrate an arrangement which may be employed when the front brake actuating cams 110 are at the upper sides of the brakes, therefore, the reverse of the form shown in Figure 2. In this arrangement a pair of brake actuating cross shafts 112 and 114 are universally supported at 116 and 118 upon supporting members 120 and 122. In order to produce the proper movement of the shafts 112 and 114, it is necessary to employ a reversing arrangement similar to that disclosed in Figures 5, 6 and 7. I therefore show a yoke-shaped support 124 carried by the axle 126 which pivotally supports at 128 a bell crank lever 130 which is pivotally connected at its lower end 132 to the pull rod 134. The upper end 136 of the bell crank lever 130 is pivotally connected to the bent ends 138 and 140 of the rock shafts 112—114. Actuation of the pull rod 134 will rotate the bell crank lever 130 in a direction to rotate the cams 110 and to move the cams in rearward directions with respect to the motor vehicle, thereby throwing greater pressure upon the unwrap brake shoes.

It will be understood that since the cross shafts carried by the axle may be actuated either directly, as in Figure 3, or through a reversing bell crank lever as in Figures 5 and 8, it is possible, if so desired, to throw greater pressure upon the wrapped shoes during forward travel of the vehicle.

I claim:

1. In a brake mechanism, an axle, wheel brakes carried by the ends of said axle, each of said wheel brakes including a pair of brake shoes, an anchor for said shoes adapted to receive brake reaction from one of said shoes, a cam for expanding both of said shoes and adapted to receive the brake reaction from the other of said shoes, a pair of rock shafts, each of which is universally supported between its ends upon said axle, the outer ends of said shafts being connected to said cams, a connection between the inner ends of said rock shafts and means for transmitting a brake actuating force to said connection in such a manner as to rotate the cams and to develop a material leverage action for moving the cams laterally towards the shoes which transmit their braking reactions to the cams.

2. In a brake mechanism, an axle, wheel brakes carried by the ends of said axle, each of said wheel brakes including a pair of brake shoes, one of which is a wrap shoe and the other of which is an unwrap shoe during application of the brakes, brake shoe expanding cams associated with said wheel brakes, a pair of rock shafts universally supported between their ends upon said axle, said shafts being connected at their outer ends to said cams, the inner ends of said shafts being offset from the normal axis of rotation of the shafts, a connection between the opposite inner ends of said shafts and means for transmitting a brake actuating force to said connection in such a manner as to rotate the cams and to develop a material leverage action for moving the cams towards the unwrap brake shoes in at least one direction of travel of the vehicle.

3. In a brake linkage for motor vehicles, a front axle, wheel brakes carried by the ends of said front axle, a rear axle, wheel brakes carried by the ends of said rear axle, each of said wheel brakes including two shoes, one of which is a wrap shoe and the other of which is an unwrap shoe upon application of the wheel brakes during travel of the vehicle in one direction, a brake expanding cam for each of said wheel brakes, a pair of rock shafts connected at their outer ends to the cams for the front wheel brakes and universally supported between their ends upon the front axle, a connection between the inner ends of said shafts, a pair of rock shafts connected at their outer ends to the cams of the rear wheel brakes and universally supported between their ends upon said rear axle, a connection between the inner ends of said last-mentioned rock shafts, a double arm brake lever positioned at an intermediate point on the vehicle and tension transmitting means for connecting said brake applying lever to the front and rear brake actuating rock shafts at points intermediate the universal supports therefor whereby the cams are rotated for applying the wheel brakes and are moved towards the unwrap brake shoes in at least one direction of vehicle travel.

EDWIN R. EVANS.